Oct. 18, 1960 H. EPSTEIN ET AL 2,957,051

MOUNTING FOR MAGNETIC HEADS

Filed June 30, 1955

*INVENTORS*
HERMAN EPSTEIN
OSCAR B. STRAM

BY

Ralph K. Bonell
AGENT 2,957,051

MOUNTING FOR MAGNETIC HEADS

Herman Epstein, West Chester, and Oscar B. Stram, Paoli, Pa., assignors to Burroughs Corporation, Detroit, Mich., a corporation of Michigan Filed June 30, 1955, Ser. No. 519,218

9 Claims. (Cl. 179—100.2)

This application relates to electromagnetic transducers which operate in conjunction with a magnetic storage medium to record and read data in computing and like apparatus. More particularly, it refers to improved mounting arrangements for such transducers.

A conventional type of transducer, or magnetic head, employed in electronic computers to record and read digital data has a magnetic circuit with which one or more windings are linked and which includes a narrow air gap. The head is commonly mounted by stationary means with the gap in close proximity to the storage medium, which may be a thin layer of magnetizable material on the surface of a rotatably mounted disc or drum. In recording, signal excitation of a winding produces an external magnetic field in the vicinity of the gap for magnetization of the storage medium while in reading, variable flux received from the magnetized medium generates a signal voltage in the same or another winding of the head.

When a disc of appreciable size is employed as the support for the magnetizable material there is a tendency for the disc to warp, producing, during rotation thereof, what is known as "surface runout." With a rigidly mounted head, the variation in head-to-disc spacing due to runout causes irregular changes in the strength of the recorded or of the read signals, as the case may be. Attempts have been made to overcome the disadvantages of a rigidly mounted head operating in conjunction with a disc subject to runout by employing a resilient mounting for the head and supplying a jet of air under pressure directed so as to lift the head from the disc surface and cause it to ride on a thin air film. If this film can be maintained at a constant thickness the head will always be spaced at a constant distance from the disc, regardless of runout. Because of practical operating difficulties, however, and because of the additional apparatus involved, the use of this jet method of forming a supporting and spacing air film has not been commonly adopted.

According to the principles of the present invention a spacing air film is self-generated as the disc bearing the magnetic storage material rotates with its surface in close proximity to a surface of a member, termed a "shoe," forming a part of the magnetic head assembly. This shoe surface is particularly contoured to aid in the generation and maintenance of the film and a type of resilient mounting for the head assembly is employed which facilitates the lifting of the assembly from the disc as the latter member starts to rotate. The compliance of this mounting is made appreciably greater than that of the generated air film in a direction perpendicular to the surface of the disc so that the film compliance, in conjunction with the mass of the head assembly, principally determines the natural frequency of vibration of the assembly.

While a spacing film of air is particularly referred to herein, the film may be composed of any fluid, gaseous or liquid, constituting the atmosphere in which the apparatus operates.

It is an object of the invention to provide an improved magnetic head assembly adapted to operate in a fluid atmosphere in conjunction with a rotatable disc bearing magnetizable material together with mounting arrangements therefor, the head assembly structure and mount being jointly effective to form and maintain a film of fluid between the assembly and disc as the disc rotates, without need for auxiliary film-generating means.

Another object is to provide improved mounting means for a magnetic head assembly operating in conjunction with a rotatable disc subject to surface runout which causes the assembly, in operation, to be spaced at a substantially constant distance from the disc regardless of runout.

Another object is to provide as a component of a resiliently mounted magnetic head assembly a member having a surface adapted by reason of its contour to cooperate with an opposed nominally plane surface for the formation of a fluid film therebetween responsive to relative motion of the two surfaces parallel to said plane.

Another object is to provide mounting means for a magnetic head assembly permitting both rotation and translation of the assembly, to a limited degree, against resilient restraint responsive to fluid pressure induced by displacement of a member in proximity thereto.

Other objects will appear hereinafter.

Figure 1:
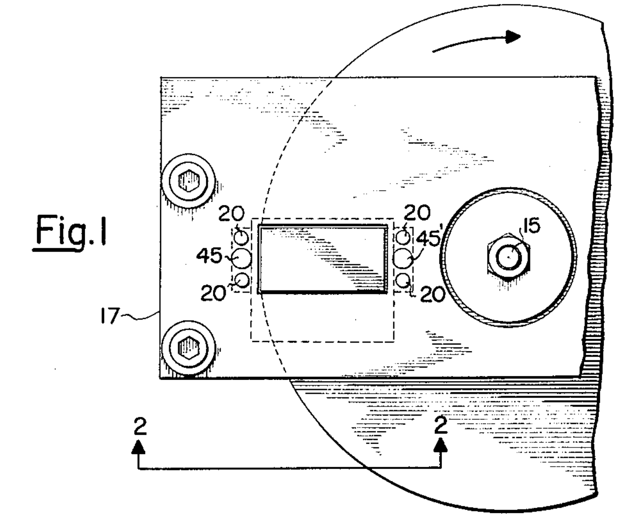
Fig. 1 is a plan view of an assembly of a rotatable magnetic disc and a magnetic head assembly, in accordance with the principles of the invention.
Figures 4A, 4B, 4C:
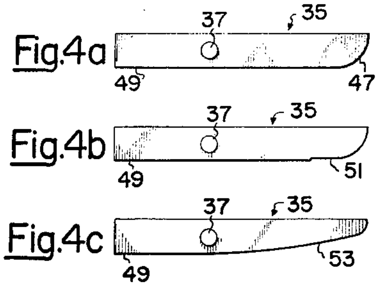
Figure 7:
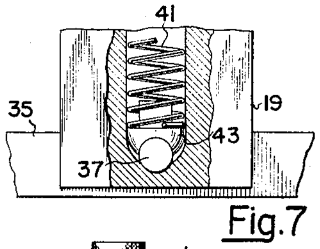
Figure 2:
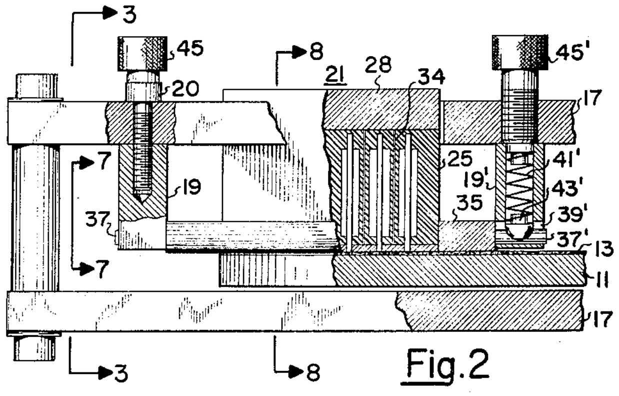
Fig. 2 is a section along the line 2—2 of Fig. 1.
Figure 3:
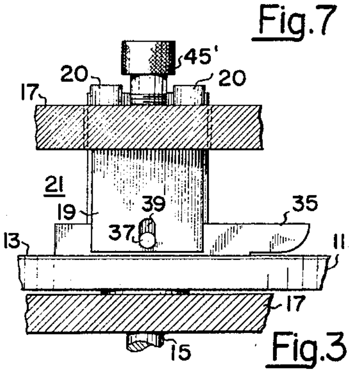
Fig. 3 is a section along the line 3—3 of Fig. 2.
Figure 5A:
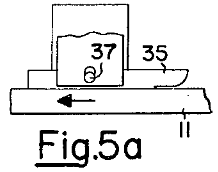
Figure 5B:
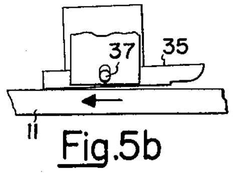
Figure 6:
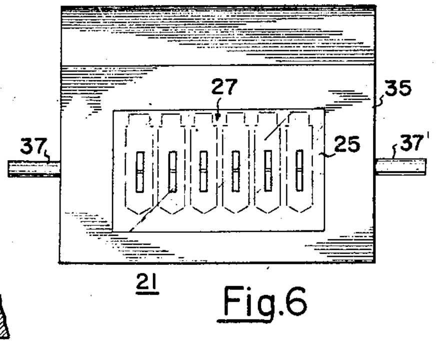
Figure 5C:
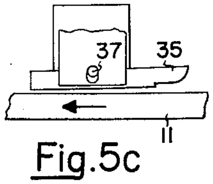

Figs. 4(*a*), 4(*b*) and 4(*c*) are elevational views of shoe members of various contours adapted, selectively, to form a part of the magnetic head assembly of Fig. 1;

Figs. 5(*a*), 5(*b*) and 5(*c*) are diagrams illustrating three phases, respectively, of the operation of the means of the invention;

Fig. 6 is a bottom view of the magnetic head assembly of Fig. 1;

Fig. 7 is a fractional sectional view along the line 7—7 of Fig. 2; and

Figure 8:
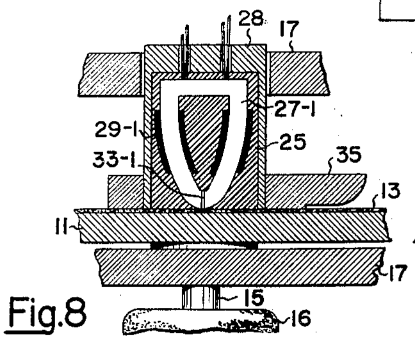

Fig. 8 is a section along the line 8—8 of Fig. 2.

Referring to the figures in detail, there is shown a circular disc 11 of non-magnetic material bearing on the upper surface thereof a layer of magnetizable material 13, such as a powdered iron oxide dispersed in a solidified resinous vehicle. Disc 11 is mounted on shaft 15 for rotation about the axis of the disc through the agency of motor 16, such rotation being in one direction, only, during operation of the apparatus, as indicated by an arrow (Fig. 1).

A portion of a stationary frame 17 is shown to which dependent brackets 19 and 19', respectively on opposite sides of magnetic head assembly 21, are attached by screws 20. Frame 17 has a rectangular aperture in which a rectangular section upper member 25 of head assembly 21 fits loosely for guided displacement normal to the surface of disc 11. Member 25 is a sub-assembly comprising magnetic heads 27 encapsulated in plastic material, together with a metallic casing 28 therefor partially surrounding the heads. The heads are of conventional design, as head 27–1 (Fig. 8) having winding 29–1 linked with a high permeability magnetic structure which includes a gap 33–1 a few thousandths of an inch in width. Heads 27 may serve for recording or reproduction or for both purposes. The heads are aligned along a radius of the disc and cross talk is minimized by inter-head shields comprising thin sheets of high permeability and high conductivity material, respectively, as shield 34 (Fig. 2).

At the base of head assembly 21 and forming a part thereof there is a flat shoe member 35 surrounding and integral with member 25. Shoe 35 extends beyond member 25 in a direction parallel to the surface of disc 11 and oppositely of the operative direction of rotation thereof. Heads 27 are thus mounted in fixed relation to shoe 35 with the gap-defining portions of the respective magnetic structures thereof in flush alignment, as to their external surfaces, with the lower surface of the shoe. From the lateral edges of shoe 35 there extend a pair of pivots 37, 37' defining a pivotal axis for head assembly 21 extending radially of the disc. Pivots 37, 37' are guided in vertically elongated slots 39 and 39' in brackets 19 and 19', rspectively and are subject to the pressure of compression springs 41 and 41' acting through saddle members 43 and 43', respectively. In its mounted position, head assembly 21 is thus biased toward engagement with disc 11 with the force exerted by springs 39, 39' individually adjustable by means of screws 45 and 45'. By virtue of the described mounting arrangements, head assembly 21, under the influence of suitable forces, can both tilt about the axis of pivots 37, 37' and move normal to the surface of disc 11 within the limits of slots 39, 39'.

When disc 11 is at rest, the lower surface of shoe 35 is in contact with the opposed upper surface of the disc, in a manner later specified herein, responsive to the pressure exerted by springs 41, 41'. In explaining the lifting force on head assembly 21 which occurs when disc 11 rotates at a suitable speed, the lower surface of shoe 35 will be considered to comprise leading and trailing areas, as determined by the operative rotation of the disc, these terms being used in a relative sense, only, except where specifically defined.

According to the principles of the invention, the lower surface of shoe 35 is so contoured that when the disc is at rest and the head assembly is in mounted position with a trailing area of this shoe surface in contact with the disc, a leading area of the same surface, including the leading edge, is out of contact with the disc. Otherwise viewed, the lower shoe surface and the opposing disc surface form the boundaries of a channel decreasing, either continuously or in steps, in vertical width as the shoe surface recedes from the leading edge thereof. This channel is adapted to direct the flow of air induced by rotation of the disc so as to raise the fluid pressure in the channel above atmospheric. A suitable speed of rotation of the disc to induce an operative lifting of the head has been found, illustratively to be about 3600 r.p.m. The excess pressure results in a force acting upwardly on the lower shoe surface in advance of the pivotal axis of the head assembly which causes an upward displacement of the assembly, as later described herein in detail.

Three shoe contours which realize the above condition are shown in Figs. 4(*a*), 4(*b*) and 4(*c*), respectively. In Fig. 4(*a*) leading area 47 of the lower surface of shoe 35 is rounded in form, trailing area 49 being plane. The radius of curvature of the leading area is exaggerated in the figure, for clarity of illustration. Since only a slight departure from the plane of the trailing area is necessary to direct the flow of air induced by rotation of the disc in the described manner, the portion of the leading area immediately adjacent said plane is the most effective part in this respect.

In Fig. 4(*b*), in addition to a rounded edge the leading area includes a plane step 51. The surface of this step is displaced 0.0002" to 0.001" from that of plane trailing area 49. In Fig. 4(*c*) the leading area merges gradually into the trailing area along a curve 53.

Using the shoe contour of Fig. 4(*b*) for purposes of illustration, three stages of the displacement of head assembly 21, as the disc accelerates from rest to full speed rotation, are shown in Figs. 5(*a*), 5(*b*) and 5(*c*), respectively. In Fig. 5(*a*) the shoe is in contact with the surface of the disc over the plane trailing area thereof. This represents the relationship of head assembly and disc when the disc is stationary. As the disc accelerates, air is dragged by friction into the channel bounded by leading area 51 Fig. 4(*b*) and the surface of the disc. A pressure higher than atmospheric is thus built up in the channel which, acting upwardly on shoe 35 in advance of the axis of pivots 37, 37' tilts head assembly 21 as shown in Fig. 5(*b*). This tilting may be considered to be the resultant of a rotation about the axis of pivots 37, 37' and a slight upward displacement of the pivots in slots 39, 39'. At higher velocities of the disc, head assembly 21 rises against the pressure of springs 41, 41' to lose contact with the disc and assume the position illustrated by Fig. 5(*c*). In this position the assembly is tilted somewhat as in Fig. 5(*b*) with the plane areas of the lower shoe surface at a slight dihedral angle with the disc surface and the trailing area is spaced from the disc by an air film of the order of 0.0002" to 0.0005". The thickness of this film tends to remain constant regardless of surface runout of the disc, such slight variations as may occur having negligible effect on signal strength. More than one step may be formed in the lower shoe surface in a manner adapted to satisfy the stated condition of decreasing channel width between disc and shoe in departure from the leading edge of the shoe surface.

The shoe contour of Fig. 4(*b*) is a somewhat more desirable one than that of Fig. 4(*a*) where rounding, only, of the leading edge of the lower shoe surface is relied upon for a directing effect on the air flow since, among other effects, its use results in more stable operation. Otherwise, operation with the shoe of Fig. 4(*a*) follows that described in connection with that of Fig. 4(*b*).

Fig. 4(*c*) is by way of an illustration of a shoe having the lower surface formed over the leading area thereof to a continuous curve which merges smoothly with a plane, or nearly plane, trailing area. The form of the leading area curve is dictated by certain principles of hydrodynamics which, for optimum performance, require the spacing, from the disc, of the leading area of the lower shoe surface to vary inversely in proportion to the density of the air in the channel bounded by the two surfaces. The stepped contour of Fig. 4(*b*) may be considered to be a first approximation to this curve and has the advantage of being formed more readily than the theoretically derived contour.

When the disc first starts rotating, shoe 35 of the head assembly is in contact with the magnetic material on the upper surface of the disc. To reduce friction and prevent possible damage a lubricant may be applied to the surface of this material. However, since the assembly lifts quickly as the disc accelerates, to ride on the air film, extensive rubbing does not occur.

As has been noted, it is the compliance of the air film on which the head assembly rides which with an assembly of specific mass principally govern the natural frequency of oscillation of the assembly in a direction normal to the surface of the disc. Under practical conditions this frequency is high relative to the frequencies of any periodic disturbances acting on the assembly. The air film also introduces damping which tends to stabilize the head assembly against vibration at its natural frequency but permits it to follow runout of the disc.

There have been illustrated and described herein certain preferred embodiments of the invention without implied limitation of the scope of the invention thereto, the scope of the invention being defined solely in the appended claims.

What is claimed is:

1. In magnetic recording and reproducing apparatus operating in a fluid atmosphere the combination of a circular disc mounted for operative rotation in one direction about the axis thereof and bearing magnetizable material on a nominally plane surface thereof, a head assembly comprising magnetic heads and a shoe member in fixed relation, each head having a magnetic structure including a gap and corresponding external portions of said structures respectively bounding said gaps being in flush alignment with a substantially flat portion of a surface of said shoe member, stationary means mounting said head assembly for limited displacement relative to the disc with said portion of said shoe surface in close opposition to said disc surface including means guiding the assembly both for rotation about a pivotal axis extending radially of and adjacent to the disc and for translation normal to the disc, and resilient means urging the head assembly toward the disc, said shoe surface in the mounted position of the head assembly extending beyond said heads oppositely of the rotation of the disc to a leading edge, said leading edge and an area of said shoe surface adjacent thereto in advance of said pivotal axis being more remote from said disc surface than areas of the surface in trailing relation thereto in order to form a channel of decreasing width as the shoe surface recedes from the leading edge thereof, whereby the flow of fluid induced by rotation of the disc is so directed as to produce an increased fluid pressure in said channel acting upon said shoe surface and tending, through guided displacement of the head assembly, to space the assembly from the disc by a fluid film.

2. The combination defined in claim 1 wherein the portion of said shoe surface adjacent the leading edge thereof is of arcuate form providing, in the mounted position of the head assembly, a progressively decreasing spacing of the surface from the opposing disc surface as the shoe surface recedes from said leading edge thereof.

3. The combination defined in claim 1 wherein said shoe surface has a stepped contour, the steps being formed to provide, in the mounted position of the head assembly, a discontinuous decreasing spacing of the surface from the opposing disc surface as the shoe surface recedes from said leading edge thereof.

4. Magnetic recording or reading apparatus comprising, a member having a relatively smooth surface capable of storing magnetic signals therein, a magnetic head assembly having a substantially planar face, a frame assembly, means loosely supporting said head assembly on the said frame assembly with said planar face positioned adjacent said surface, said supporting means comprising lost motion means including portions of said frame assembly arranged on opposite sides of said head assembly, one of said assemblies having a slot on opposite sides thereof and extending in a direction normal to the member, the other of said assemblies having pivot pins extending into said slots, said pins and slots being relatively arranged so as to permit said head assembly to pivot about said pins and to move bodily translationally relative to said member as guided by said pins and slots and in a plane extending through said head assembly and in a direction normal to the surface of said member, means for causing relative rotation between said member and said head assembly to induce between the surface of the member and the head assembly an air stream forming an air cushion for supporting the head assembly close to but out of contact with said surface during such relative rotation, and means biasing said head assembly toward said surface with said planar face against the air stream in a manner whereby said air cushion, in response to variations in the cotour of said surface, is effective to cause said head assembly to rock about said pivot pins and to move bodily translationally relative to said frame and said member as guided by said pins and slots thus to assume positions corresponding substantially to the contour of the portions of the surface of said member passing said head assembly during said relative rotation of said surface and said head assembly.

5. Magnetic recording or reading apparatus comprising, a rotatably mounted disk member having a relatively smooth surface capable of storing magnetic signals therein, a magnetic head assembly having a substantially planar face, a fixed frame assembly, means loosely supporting said head assembly on said frame assembly with said planar face positioned adjacent said disk surface, said supporting means including portions of said fixed frame assembly arranged on opposite sides of said head assembly, one of said assemblies having a slot on opposite sides thereof and extending in a direction normal to said disk surface, the other of said assemblies having pivot pins extending therefrom along a radius of said disk and into said slots, said pins and slots being relatively arranged so as to permit said head assembly to rock about said pivot pins and to move bodily translationally relative to said disk as guided by said pins and slots, means for rotating said disk relative to said head assembly to induce therebetween an air stream forming an air cushion for supporting said head assembly close to but out of contact with said disk during rotation of said disk, and means biasing said head assembly toward said disk surface with said planar face against the air stream in a manner whereby said air cushion, in response to variations in the contour of said disk surface, is effective to cause said head assembly to rock about said pivot pins and move bodily translationally relative to said frame and said disk as guided by the arrangement of said pins and slots thus to assume positions corresponding substantially to the contour of the portions of the disk surface passing said head during said rotation of said disk.

6. Magnetic recording or reading apparatus comprising, a rotatably mounted disk having a relatively smooth surface capable of storing magnetic signals therein, means for rotating said disk, a magnetic head assembly having a substantially planar shoe face and a portion extending in a direction opposite to the direction of rotation of said disk and providing an extension to said shoe face increasingly removed from said disk surface toward the end of the extension farthest removed from said head, a fixed frame assembly, means loosely supporting said head assembly on the said frame assembly with said planar face positioned adjacent said disk surface, said supporting means including portions of said fixed frame assembly arranged on opposite sides of said head assembly, said frame assembly having a slot on each of said portions thereof and extending in a direction normal to said disk surface, said head assembly having pivot pins on opposite sides thereof and extending along a radius of said disk and into said slots, said pins and slots being relatively arranged so as to permit said head assembly to rock about said pivot pins and to move bodily translationally relative to said disk, the rotation of said disk inducing an air stream on the disk surface thus to form an air cushion for supporting said head assembly close to but out of contact with said disk surface during rotation of said disk, and means biasing said head assembly toward said disk surface with said shoe face and its extension against the air stream in a manner whereby said air cushion, in response to variations in the contour of said disk surface, is effective to cause said head assembly to rock about said pivot pins and to move bodily translationally relative to said frame and said disk as guided by the arrangement of pins and slots to assume positions corresponding substantially to the contour of the portions of the disk surface passing said head during the rotation of said disk.

7. A magnetic head assembly for operation in close association with a rotating member, said assembly comprising, a magnetic head, a shoe member in fixed relation thereto, said shoe member having a planar surface, said head having portions in flush alignment with said planar surface of said shoe member, said planar surface being adapted to operate in close opposition to a surface of the rotating member for generating a spacing fluid film between said shoe member and the said surface of said rotating member, said shoe surface having an extension in the direction opposite to the direction of movement of said rotating member and terminating in a free leading edge, and means for mounting said head assembly for both pivotal movement transverse to the direction of movement of said rotating member and bodily straight line translational movement normal to said rotating member.

8. The combination defined in claim 7 wherein that portion of said shoe extension adjacent to the free leading edge thereof is of arcuate form providing in the mounted position of the head assembly a progressively decreasing spacing of the surface from the opposing surface of the rotatable member when associated therewith as the shoe surface recedes from said leading edge thereof to said planar surface.

9. The combination defined in claim 7 wherein the surface of said extension is of stepped contour, the steps being formed to provide, in the mounted position of the head assembly a discontinuous decreasing spacing of the surface from the surface of said rotating member as the surface recedes from said leading edge to said planar surface.

References Cited in the file of this patent

UNITED STATES PATENTS

| | | |
|---|---|---|
| 1,990,548 | Keller et al. | Feb. 12, 1935 |
| 2,038,216 | Harrison et al. | Apr. 21, 1936 |
| 2,370,134 | Begun | Feb. 27, 1945 |
| 2,532,803 | Faus | Dec. 5, 1950 |
| 2,732,275 | MacNeill | Jan. 24, 1956 |
| 2,736,775 | Camras | Feb. 28, 1956 |
| 2,750,579 | Lekas et al. | June 12, 1956 |
| 2,769,037 | Dank et al. | Oct. 30, 1956 |
| 2,772,135 | Hollabaugh et al. | Nov. 27, 1956 |
| 2,802,905 | Taris | Aug. 13, 1957 |

FOREIGN PATENTS

| | | |
|---|---|---|
| 763,780 | Great Britain | Dec. 19, 1956 |